(12) United States Patent
Joukov et al.

(10) Patent No.: US 8,819,672 B2
(45) Date of Patent: Aug. 26, 2014

(54) MULTI-IMAGE MIGRATION SYSTEM AND METHOD

(75) Inventors: Nikolai A. Joukov, Thornwood, NY (US); Birgit M. Pfitzmann, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 12/885,752

(22) Filed: Sep. 20, 2010

(65) Prior Publication Data

US 2012/0072903 A1    Mar. 22, 2012

(51) Int. Cl.
*G06F 9/445*     (2006.01)

(52) U.S. Cl.
USPC ........... 717/177; 717/175; 717/176; 717/167; 717/144; 709/201; 709/233

(58) Field of Classification Search
CPC combination set(s) only.
See application file for complete search history.

(56) References Cited

U.S. PATENT DOCUMENTS

| | | | |
|---|---|---|---|
| 6,247,055 B1 * | 6/2001 | Cotner et al. | 709/227 |
| 6,324,467 B1 * | 11/2001 | Machii et al. | 701/420 |
| 7,613,740 B2 * | 11/2009 | Holenstein et al. | 707/615 |
| 7,698,392 B2 * | 4/2010 | Zapata et al. | 709/220 |
| 8,132,186 B1 * | 3/2012 | Okcu et al. | 719/321 |
| 2003/0154468 A1 * | 8/2003 | Gordon et al. | 717/143 |
| 2003/0233646 A1 * | 12/2003 | Cohen et al. | 717/174 |
| 2004/0205748 A1 * | 10/2004 | Iyer | 717/174 |
| 2004/0243577 A1 * | 12/2004 | Choudhary et al. | 707/6 |
| 2004/0243978 A1 * | 12/2004 | Walmsley | 717/120 |
| 2005/0038960 A1 * | 2/2005 | Himmel et al. | 711/115 |
| 2005/0262194 A1 * | 11/2005 | Mamou et al. | 709/203 |
| 2006/0041613 A1 * | 2/2006 | Fackelmayer et al. | 709/203 |
| 2006/0047946 A1 * | 3/2006 | Keith, Jr. | 713/2 |
| 2006/0112381 A1 * | 5/2006 | Bayus et al. | 717/168 |
| 2006/0200501 A1 * | 9/2006 | Holenstein et al. | 707/202 |
| 2007/0150443 A1 * | 6/2007 | Bergholz et al. | 707/3 |
| 2008/0134156 A1 * | 6/2008 | Osminer et al. | 717/140 |
| 2009/0265684 A1 * | 10/2009 | Fuchs et al. | 717/105 |
| 2009/0307174 A1 * | 12/2009 | Devarakonda et al. | 706/48 |
| 2009/0307685 A1 * | 12/2009 | Axnix et al. | 717/174 |
| 2009/0307743 A1 * | 12/2009 | Azagury et al. | 726/1 |
| 2010/0088684 A1 * | 4/2010 | Gulwani et al. | 717/139 |
| 2010/0114816 A1 * | 5/2010 | Kiilerich | 707/610 |
| 2010/0325410 A1 * | 12/2010 | Fitzgerald et al. | 713/2 |
| 2011/0055816 A1 * | 3/2011 | Joukov et al. | 717/126 |
| 2011/0161952 A1 * | 6/2011 | Poddar et al. | 717/173 |
| 2011/0307531 A1 * | 12/2011 | Gaponenko et al. | 707/822 |
| 2012/0284389 A1 * | 11/2012 | Azagury et al. | 709/223 |
| 2014/0019584 A1 * | 1/2014 | O'Connor et al. | 709/217 |

OTHER PUBLICATIONS

Geay, E., et al. "Modular String-Sensitive Permission Analysis With Demand-Driven Precision" 31st International Conference on Software Engineering, ICSE 2009. May 2009 pp. 1-11.

(Continued)

*Primary Examiner* — Chameli Das
(74) *Attorney, Agent, or Firm* — Tutunjian & Bitetto, P.C.; Louis J. Percello

(57) ABSTRACT

A system and method for application migration include matching an infrastructure of a source application with a plurality of multi-image work sets from a catalog by selecting a mapping of components of the infrastructure with components in the multi-image work sets to provide one or more selected multi-images. The source application is migrated to a target environment using the one or more selected multi-images.

22 Claims, 8 Drawing Sheets

(56) References Cited

OTHER PUBLICATIONS

Joukov, N., et al. "Built-To-Order Service Engineering for Enterprise it Discovery" 2008 IEEE International Conference on Services Computing (SCC 2008). Jul. 2008 pp. 1-8.

Magoutis, K., et al. "Galapagos: Model-Driven Discovery of End-To-End Application-Storage Relationships in Distributed Systems" IBM Journal of Research and Development. vol. 52, No. 4/5. Jul./Sep. 2008. pp. 367-377.

* cited by examiner

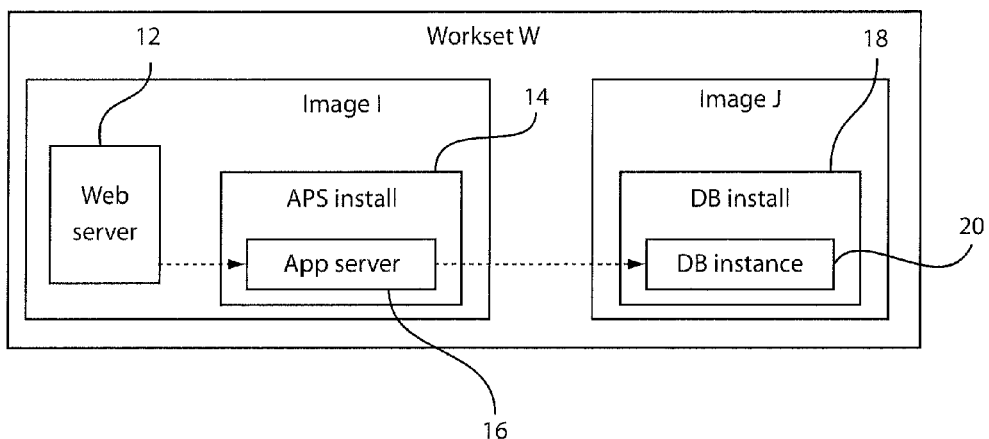
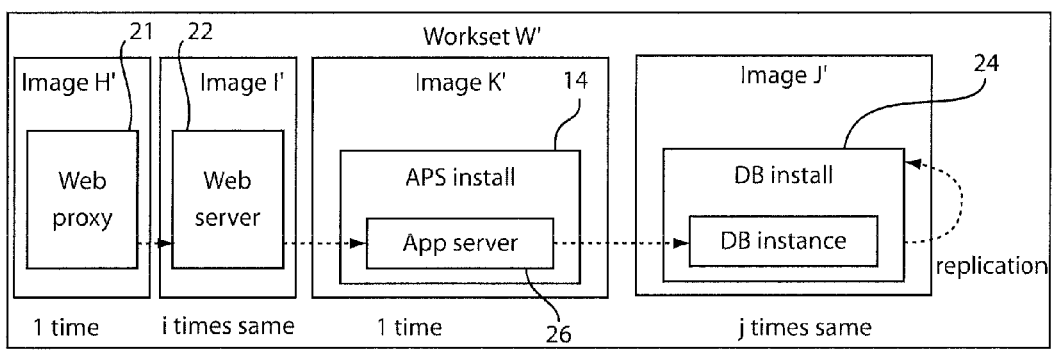
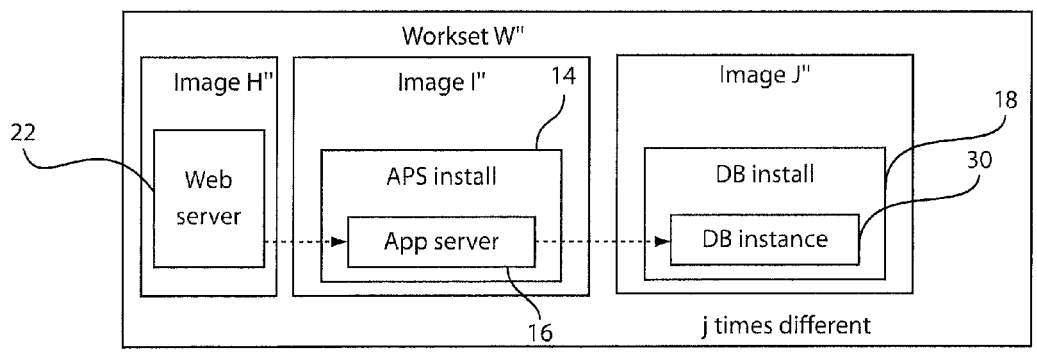
FIG. 1

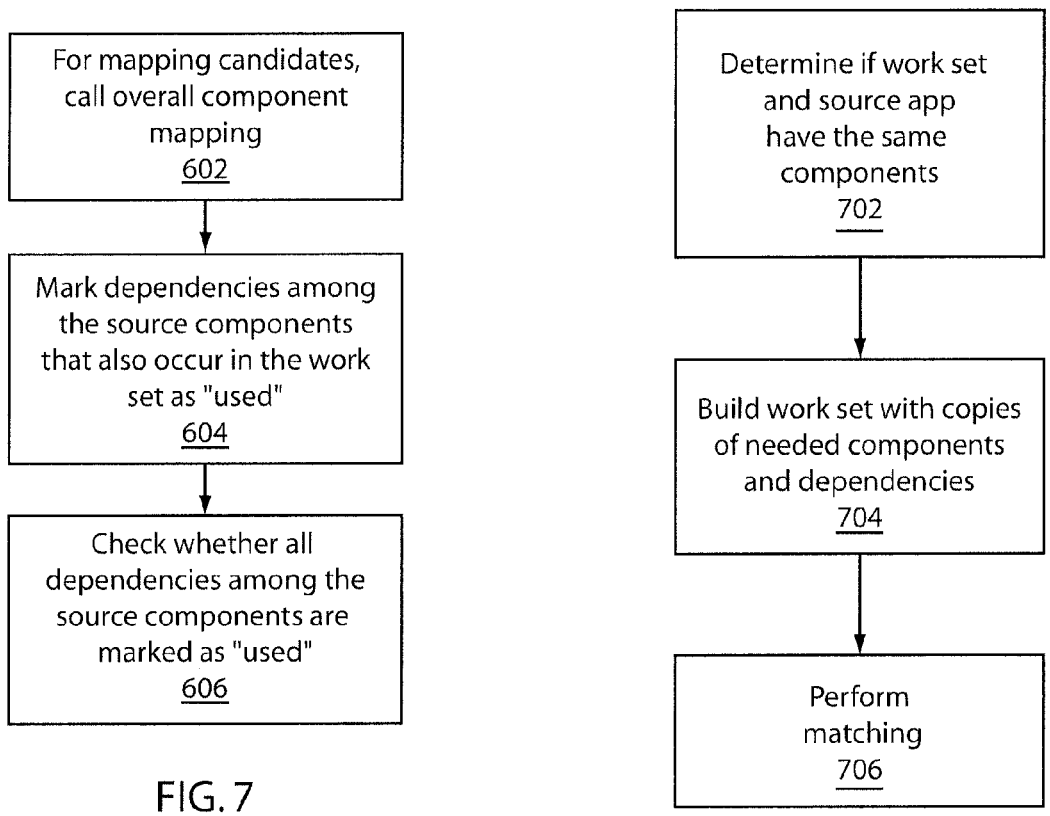

MULTI-IMAGE MIGRATION SYSTEM AND METHOD

BACKGROUND

1. Technical Field

The present invention relates to computer component migration and more particularly to systems and methods which employ multiple image combination to analyze and enable migration.

2. Description of the Related Art

Many enterprises perform data-center transformations, consolidations, and migrations to reduce costs and make information technology (IT) greener. This includes server virtualization, server migrations to clouds, and server migrations between data centers. Classically, migration concentrates on individual servers in a source infrastructure, and migrates server content to other physical servers or new virtual images. For example, classically one may migrate to a newer or larger server model from the same model series as before, migrate to a server from a different model series or vendor, migrate to a newer or different operating system or perform a physical-to-virtual conversion of a source system. In such migrations, compatibility and costs associated with changes only have to be considered between the source systems and target hardware, hypervisors or operating systems. Other classic migration types are software upgrades or changes. In such migrations, compatibility and costs associated with changes only have to be considered between one piece of software and a related piece of software.

The increasing cost of IT management, compared with hardware cost and application development, has led to new types of infrastructures called clouds. Clouds gain a lot of their benefits from strong standardization, which simplifies management and thus reduces costs and errors. Many clouds, in particular those called platform-as-a-service clouds, offer virtual images that can easily be deployed onto physical machines.

An offering is a catalogue of images from which users can choose, and actual images according to the catalogue descriptions are available in an image library and can quickly be copied to a real server and started there. Some of these virtual images contain not only an operating system, but also certain software components that are already installed. This permits faster deployment if an image with such software is needed, and yields more standardized installations.

SUMMARY

A system and method for migration include matching an infrastructure of a source with a plurality of multi-image work sets from a catalog by selecting a mapping of components of the infrastructure with components in the multi-image work sets to provide one or more selected multi-images. The source is migrated to a target environment using the one or more selected multi-images.

A system includes a processor and a memory coupled to the processor. A tool, stored in memory, for matching multi-image work sets with a source application is configured to match an infrastructure of the source application with a plurality of multi-image work sets from a catalog; select a mapping of components of the infrastructure with components in the multi-image work sets to provide one or more selected multi-images; and migrate the source application to a target environment using the one or more selected multi-images.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1 is a block/flow diagram showing illustrative multi-image work sets in accordance with one embodiment;

FIG. 7 is a block/flow diagram showing a system/method for a dependency matching phase for matching the multi-image work sets with the source application in accordance with one embodiment;

FIG. 8 is a block/flow diagram showing a system/method for an image matching phase with parameterized multi-image work sets in accordance with one embodiment;

DETAILED DESCRIPTION OF PREFERRED EMBODIMENTS

Figure 2:
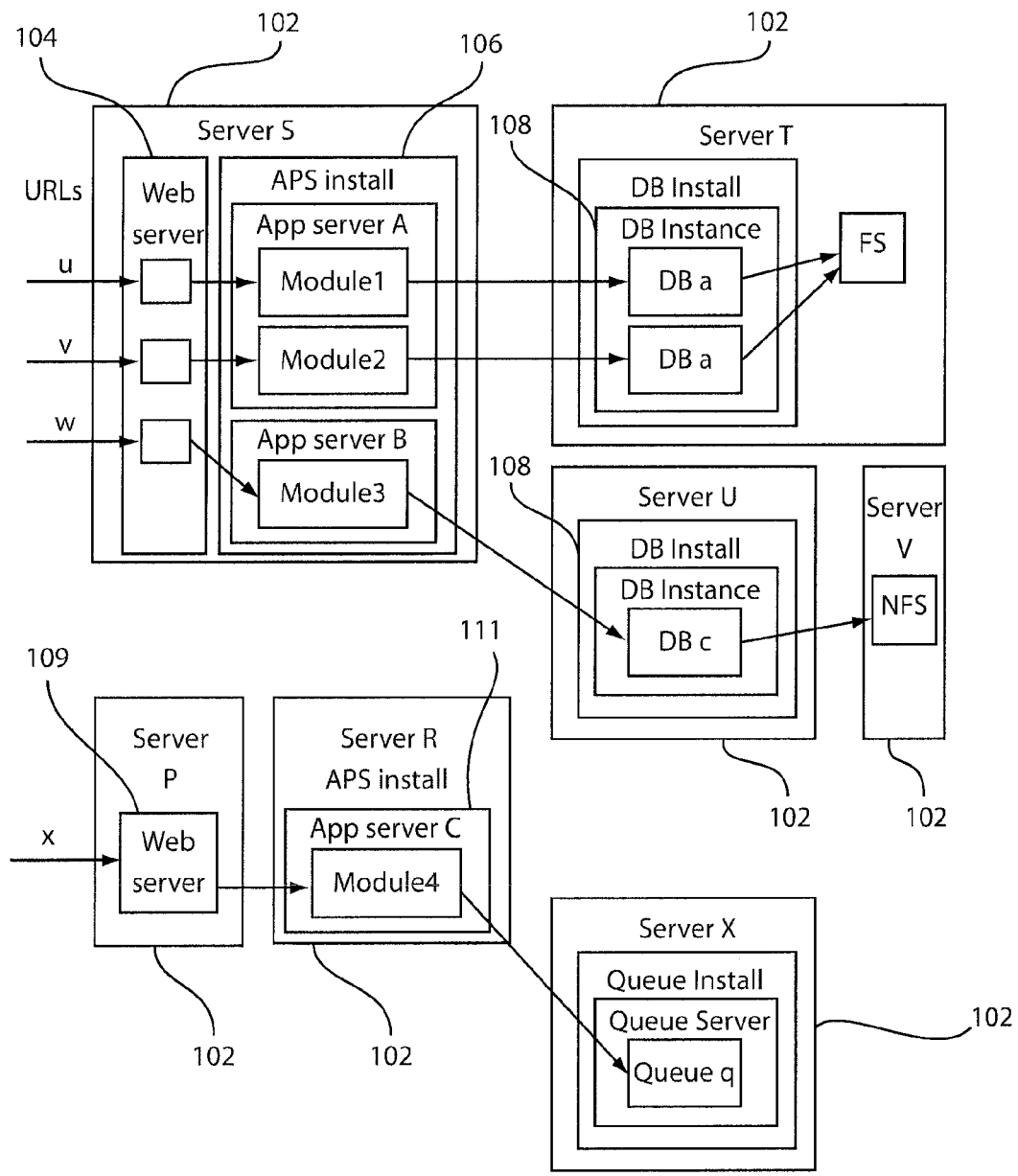
FIG. 2 is a block/flow diagram showing an illustrative source application (or portion thereof) to be migrated in accordance with one embodiment.

In accordance with the present principles, systems and methods for comparing multi-image structures are provided. The comparison is between an overall set of source systems that are candidates for a migration and a catalogue of cloud multi-image work sets. The comparison is made to decide whether the source systems can be migrated to the multi-image worksets, and thus to exploit advantages of the work sets for existing workloads. One advantage of work sets is simplified management of multi-tier applications, and thus reduced cost and risk. The work set images are employed to model source applications. Once the source application (or portion thereof) have been matched and mapped to multi-image work sets, the source applications may actually be migrated to the corresponding multi-image work sets. A migration plan is known and more easily executed. The overall migration plan may also include some migrations of source system to single images if no suitable multi-image workset is found for certain source systems.

An image is a snapshot of a running computer system. In virtualized IT environments, images may actually be stored (i.e., put onto some storage medium, instead of or in addition to a currently running version), and later re-instantiated. Images may also be copied, so that one can instantiate several initially identical running versions. One may make a catalogue or other list, web site, and the like that describes currently available images, in particular images that were prepared for being reused, e.g., by the general public, or as a standard installation within an enterprise. The image catalogue includes image descriptions, the image library includes the actual corresponding images.

A provider of a cloud infrastructure may provide specific images with operating system configurations as well as possibly some pre-installed software for all its consumers. The provider may also allow other parties to add more images to such an image catalogue and library. An enterprise that is a cloud consumer may start with images of its own or those of a cloud provider and add them to a specific sub-catalogue of images to be used by this enterprise.

Many enterprise applications, such as travel applications, human resources (HR) applications, web catalogues, and the like, comprise more than one source server, and will similarly comprise more than one image when migrated to a cloud. For example, a travel application may use a web server for users to request and grant travel approval, an application server that governs the approval flows, and a database with current and past travel requests and general information. The web server, the application server, and the database may be implemented on different physical servers initially and also on different images later. This may be needed for performance and reliability—there may even be multiple load-balanced web servers, or multiple replicated databases. This also simplifies the management of each server and later of each image if there is only one key software type on each image.

Image catalogues may include multi-image work sets, i.e., structures of multiple images that can be selected as a whole, and that have some preconfigured settings to interact when they are instantiated when actually running. This instantiation may include automatic updates of concrete addresses into template addresses, e.g., if an application server is configured to use a database. If an entity builds a new enterprise application, they can select such a multi-image work set from a catalogue, and will have a much easier time deploying their application code than if they had to build it from individual images or even from scratch. For example, they will have a standardized IT environment that is easier to manage, is cheaper to implement and has less risk.

However, for existing enterprise applications, there was not yet a method of analyzing how to migrate the applications to multi-image work sets so that they can also profit from the easier management.

An image collection may be called a work set or virtual appliance. Such image collections include already configured dependencies between software components, e.g., a configuration that a web server directs some of its requests to an application server, or that an application server uses a certain database. Thus, an image catalogue includes descriptions of such work sets including, e.g., the number of images, the software components on them, and the preconfigured dependencies between them. When a user chooses a work set, the images get installed from the library, including the preconfigured dependencies, and if there is any need to update these, e.g., with concrete mutual addresses, this is done automatically during the installation. Hence, multi-image work sets implemented in accordance with the present principles permit faster deployment for combinations of software, and yield an even more standardized installation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages, and scripting languages, such as Perl and the like, as well as rule-based systems such as Prolog or IBM™ ILOG JRules. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, three illustrative work sets W, W', and W" are shown as they might exist in a cloud image catalog to illustrate the present principles. Work set W shows a two-image work set having images I and J. An image is a virtual-machine image, which is preferably ready to be deployed in a cloud or other network. Image I includes a web server installation 12 and an application server (APS) installation 14, with one instance 16 set up. Image J includes a database (DB) installation 18, with one instance 20 set up. There are no applications or databases in the images I and J as these will be provided by the users of this work set when deployed. The graphical representation of the work sets is only one example; there may be other representations such as web pages with textual descriptions of these structures, tabular formats, database formats, or XML files.

Work set W' includes images I' and J' as well as images H' and K'. Work set W' includes parameterized work sets, i.e., there are parameters, i and j, that a user can select when choosing this work set from the catalog. At the front end, the work set W' includes an image H' with one web proxy 21. This web proxy 21 serves as a load balancer for a number of identical web servers 22. Each of these web servers 22 is an instance of image I', e.g., if a user needs ten web servers and thus chooses i=10, then Image I' is deployed ten times. These instances of servers 22 are the "same" which means that they are meant to get the same content. Similarly, at the backend there may be j databases 24, all replicas of each other. So, e.g., if a user chooses j=2, then image J' is replicated twice. The dependencies are replicated as well, i.e., the web proxy 21 will be linked to each web server 22, and an application server 26 to each database 24. Additionally, the databases 24 all replicate with each other.

Work set W" is also a parameterized work set, but instead of replication, we now allow j different databases 30. Thus, if a user chooses this work set with j=3, they will get 3 instances of Image J"', and the application server 16 will be linked to each of them, as with work set W', but the databases will not be replica of each other, which may internally mean different settings in the application server 16, besides the lack of replication configurations among the databases. The user can put different content in each database instance 30.

Referring to FIG. 2, a source application or a portion thereof (which may be part of a much larger set of discovered infrastructure) is illustratively shown. The source application(s) may be part of a large model resulting from a discovery phase of a migration process. There may be hundreds or thousands of physical or virtual servers. Servers 102 are indicated as S, T, U, V, P, R and X. This example has some similarity to the work set samples in FIG. 1. Again, the graphical representation is only one of many ways of representing the infrastructure; other ways include tabular formats, database formats, or XML files. E.g., on server S, a web server 104 and an APS install 106 are included as in image I in Work set W. As this illustrates a working source system, there are URLs implemented on the web server 104 and modules (module 1 and module 2) in the APS install 106. The server S is somewhat suitable for matching with image I, i.e., within an overall multi-image matching method as described below one may consider whether one can migrate server S to an instantiation of image I and with what modifications, assuming servers related to server S can be migrated to the remaining images in work set W.

An exact match between a source application and a work set is preferable. However, many instances will not provide an exact match. For example, there is one difference between server S and image I, in that there are two different app servers A and B in the APS install 106 on server S. Furthermore, when we look at dependencies, server S is further linked to two database instances 108 on two different servers T and U, while work set W only includes one such server (16). These situations will be addressed below. If App server B were not there, nor its dependencies, then a perfect match would exist between the server pair (S, T) and the work set W. Here, we assume that file systems ("FS") are not explicitly represented in the work sets, i.e., the component FS on server T does not matter. Such strategies of what does and does not matter are discussed in more detail below.

As an alternative match, servers S, T, and U would together be a match for work set W" if either app server B and the dependency on server V were not there, or one is allowed to add them to W", and if one is allowed to split the web server 104 and the APS install 106 from S onto two images (I" and J" in FIG. 1).

Figure 3:
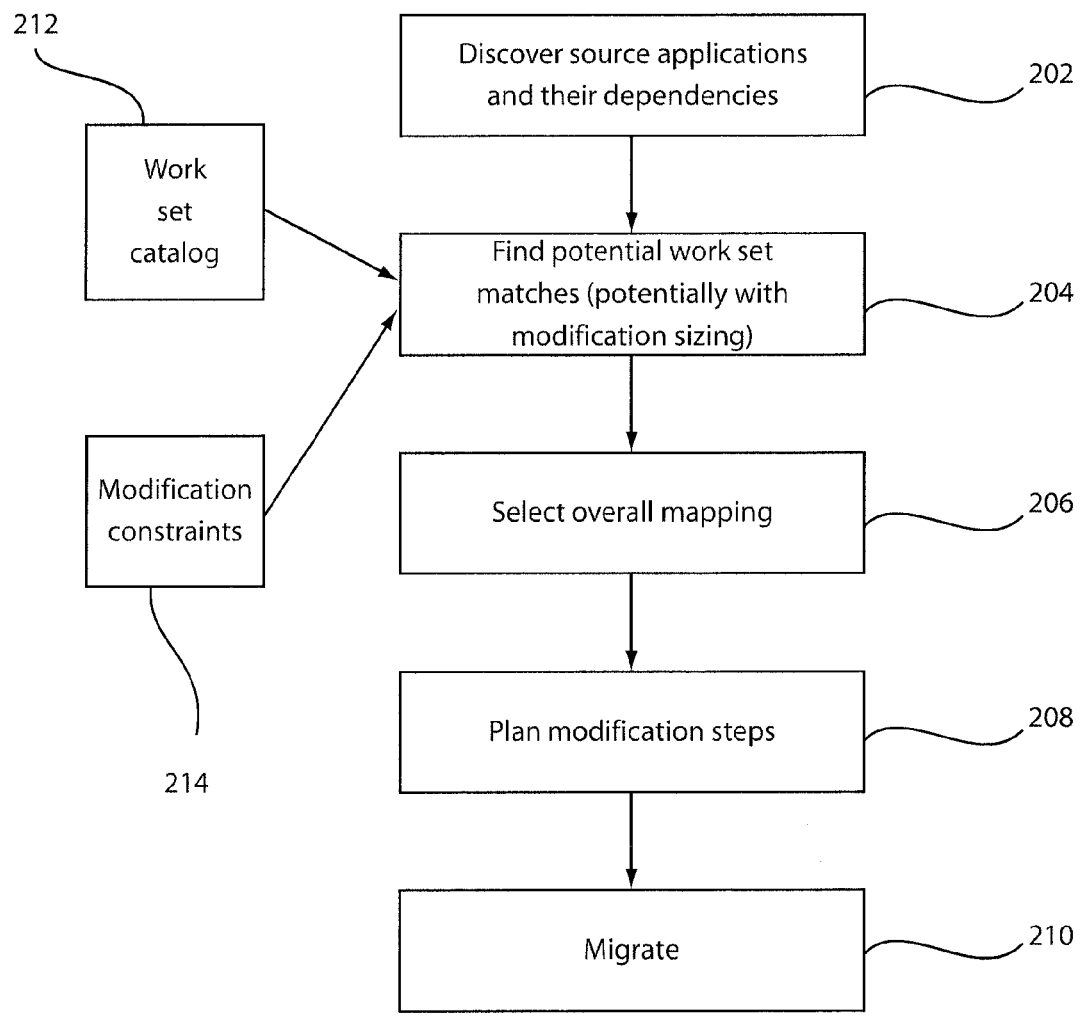
FIG. 3 is a block/flow diagram showing a system/method for matching multi-image work sets with a source application to enable migration in accordance with one embodiment.

Referring to FIG. 3, a block/flow diagram illustratively shows a system/method for migration using multi-images. In block 202, source software components, their dependencies, and source servers that these software components are on are discovered. This may include analyzing software configurations, querying software for its configuration, observing network traffic, and analyzing application code to discover external resources and how they relate to the proper execution of the application code. Carrying out such discoveries can be performed using techniques known in the art. A discovery tool may already be in place in the source systems, or may be deployed specifically for the migration. While such automatic discovery is preferable, the following steps also work if discovery is manual, e.g., by asking application owners, etc.

In block 204, potential work set matches are found. These potential work set matches are candidates selected from, e.g., a library of multi-image work-sets in a work set catalog 212 that are similar in structure to the discovered source systems and software components. If an exact match is not found, modification constraints may be applied to evaluate the differences between the source system structure and the work sets in the catalog 212.

In block 206, an overall mapping is computed or selected. Here the source system structure is mapped to the multi-images in the catalog 212, by choosing from the potential matches from block 204 (which may be overlapping or alternatives to each other), and mapping remaining source images to individual images, e.g., server X in FIG. 2 for which there is no suitable image in any of the work sets in the example catalog of FIG. 1. In block 208, modification steps are planned and in block 210 the application is migrated using the multi-image template, i.e., in a cloud. The selected multi-image work sets are instantiated, then any changes to their configurations are made which may be needed to ensure matching. Then, application data are migrated onto the multi-image work sets. In another embodiment, where there is no cloud with an actual image library, only a catalog of preferred setups, the multi-image descriptions may guide a more from-scratch building of corresponding target structures and migration of the source data.

Based on the examples of work sets in FIG. 1 and the components to be migrated in FIG. 2, the method of FIG. 3 will be applied to illustrate the present principles. The work sets W, W', W" would be three of many in the work set catalog 212. The source applications shown in FIG. 2 would be part of the result of discovery. In the matching step of block 204, we find individual sets of servers in the source applications that match individual work sets such as W, W', or W". In the selection step of block 206, we may select from several possible matches. The matches may be scored to determine a best match for the source application.

If we only match self-contained server groups that have no dependencies other than those present in a work set, this selection of an overall mapping can be done per connectivity component of the source environment. If we allow additions of dependencies to target images, there may be overlapping potential matches after the matching step and we may use global cost computations. E.g., out of the three servers P, R and X in FIG. 2, a work set W_front may match P and R, while another work set W_back matches R and X. Then, a decision needs to be made whether it would be easier to use W_front and an additional image with a queue server, or to use W_back and an additional image with a web server. Rules and modification constraints that govern how much one is willing to change between the source system and the multi-image work sets (block 214) may be provided to assist in these situations.

The matching in block 204 may include a plurality of different methods. In one embodiment, source systems (e.g., collectively referred to hereinafter as source system 100 in FIG. 2) and work sets (e.g., W, W', W", etc., collectively referred to hereinafter as work sets 10 in FIG. 1) can be seen as labeled graphs. Nodes in the source system 100 have at least two labels (or attributes), e.g., a node name or identifier (such as "Module 1" in the example) and a type (such as "APS install"). The word "type" is just one example of naming such groupings, another word may be "class". Nodes in the work sets 10 have at least a type label. For the matching, we assume the type sets used for work sets 10 and source systems 100 are the same. There may be a preliminary terminology mapping to get the labels to agree.

For edges, it is useful to distinguish inclusions (as shown as nested boxes in FIGS. 1 and 2) from other dependencies (shown as arrows in FIGS. 1 and 2). Inclusions are used for components that run "inside each other", offering each other an environment or abstraction layer, e.g., a database in a database instance based on a database installation. Inclusions may imply co-location. Dependencies (arrows) may occur or may be shown at different levels of inclusion. In work sets, dependencies will mainly occur for instances. In source systems, they may also occur for inner objects (such as individual modules and databases) or only be known at the server level (e.g., if observed via network statistics). It may be assumed in the following that all server-level dependencies that can be associated with known middleware on that server have in fact been associated as precisely as possible.

Several types of matching are possible. The types of matching may have tradeoffs. These tradeoffs may include: ease of migration (best with close matches that do not need source changes), steady-state simplicity (best with close matches that do not need target changes) and coverage (more existing workloads can be migrated to the given multi-image work sets). Several types of matching may be offered within a single tool, and may come with a cost/benefit analysis of selecting a particular matching method. The matching method selection may be implemented as a modification constraint in block 214 of FIG. 3.

The matching of block 204 will be described in greater detail for one embodiment as a preparatory phase (FIG. 4), an image matching phase (FIG. 6), and a dependency matching phase (FIG. 7).

Types of Node Matching: The multi-image matching builds upon matching individual components. In one embodiment, an underlying node matching scheme may employ known node matching methods. The scheme employed may be given as a modification constraint in block 214. Node types may be defined and matched at different levels of detail, e.g.: 1) only a source DB2™ database version 9.7 may match a work set DB2™ database version 9.7; 2) all source DB2™ databases version 9.0 to 9.7 may match a work set DB2™ version 9.7. (This requires a software upgrade for any version other than 9.7); 3) all source DB2™ database versions may match a work set DB2™ version 9.7 (this would need more complex upgrades if the source version is older than version 9); or 4) even databases of other vendors may match a source DB2™ database version 9.7. (This may need a database migration). The node matching criteria presented are for illustrative purposes. Other matching levels and rules are also contemplated.

Node configurations: Configuration files may also be compared if the images preconfigure the configuration files. For example, if a source DB2™ instance defines a certain diagnostic level, a target image diagnostic level may be desired to be at least equally as good or better. Such matching options are not considered in classic single-image migrations since there is no existing middleware on the target image, but may also be useful in migrations with single-image cloud targets, in particular for those source servers for which we do not find a match in the initial potential work set matching (e.g., block 204) or that remain when selecting overall mappings (block 206).

Dealing with Infrastructure Elements: Infrastructure nodes and dependencies. An infrastructure includes common services, e.g., domain name system (DNS), Lightweight Directory Access Protocol (LDAP), print servers, etc. These cannot be put into each work set. However, many source servers will depend on these services. Hence, in the matching they may be excluded. This may include simply deleting all nodes of these types and all dependencies with them from a source graph. Alternatively, one may leave dangling dependencies in the work set, e.g., a dependency from an APS server to a not-included LDAP server, meaning that this work set is able to use a general LDAP server available in a target cloud.

Infrastructure or "easy" software on servers. Similarly, servers may include infrastructure programs like shells, or infrastructure software like monitoring agents, etc. that may not be desirable to consider in the matching. These types of programs may be deleted from the source graph before the main part of the matching (e.g., in block 204).

Figures 4, 6:
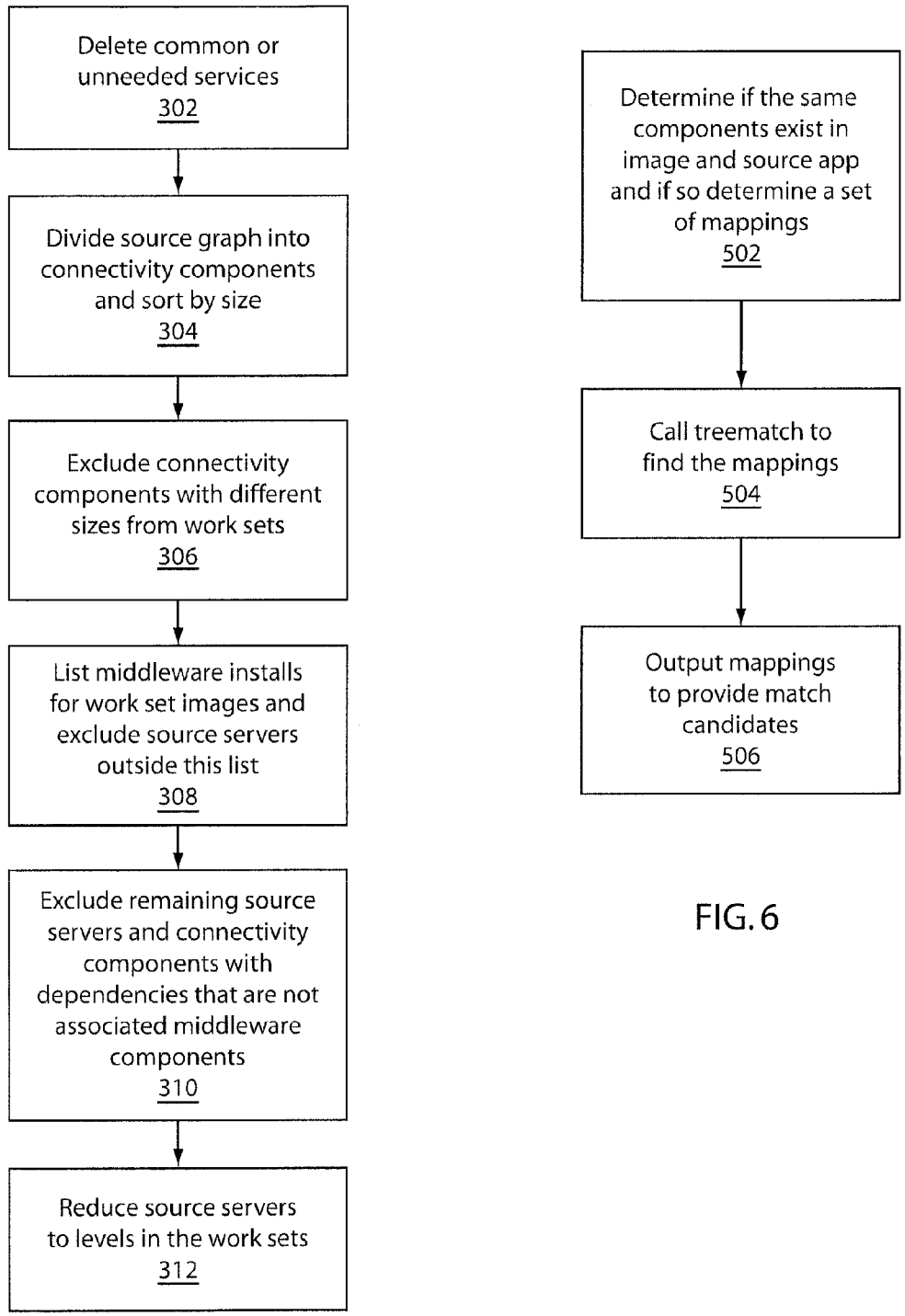
FIG. 4 is a block/flow diagram showing a system/method for a preparatory phase for matching the multi-image work sets with the source application in accordance with one embodiment.
FIG. 6 is a block/flow diagram showing a system/method for an image matching phase for matching the multi-image work sets with the source application in accordance with one embodiment.

Referring to FIG. 4, a preparatory phase for a precise matching method is shown in accordance with one illustrative embodiment. The matching problem belongs to the class of graph isomorphism problems. Graph isomorphism is in NP, and not known to be either in P or NP-hard. However, in most practical cases, we can solve the multi-image matching problem quite fast, for at least the following reasons: The work sets will not be large, especially if parameterization is employed as with work sets W' and W''. Our examples with three to five main software installation types are realistic, and the nodes have types which will reduce the possibilities for matching very significantly.

Precise matching means no parameterized work sets, and that the source structure and a matched work set have precisely the same software components (as far as they are considered for matching) with the same inclusion relations, the same dependencies, etc. In block 302, delete not-to-be considered infrastructure services, dependencies, and software from the source graph. In block 304, divide the source graph into connectivity components. A connectivity component is a set of nodes in a graph, (here source servers) that have no link to graph nodes outside this set (here no dependencies to source servers outside this set), but cannot be divided into smaller such sets. In other words, one can get from every graph node in a connectivity component to every other graph node in the same connectivity component by following links, but not to any other node. The example of FIG. 2, assuming nothing were deleted in block 302, has two connectivity components, servers S, T, U, V and servers P, R, and X. This can be analyzed efficiently with well-known methods. The connectivity components can be sorted by size, i.e., by the number of nodes in them (here number of source servers). In block 306, connectivity components whose size is different from all work set sizes are excluded, e.g., size=number of servers/images. In block 308, make a list or hash table MW of middleware installs occurring on at least one work set image. Exclude all source servers that include an install $m \notin MW$, and their entire connectivity components. In block 310, if a remaining source server includes a dependency on the server level that has not been (e.g., cannot be) associated with some middleware component, exclude this server and its connectivity component. In block 312, reduce the components on the source servers to the levels of depth that the work sets include. These may include two levels: installations and instances (as in the work set examples). If there are inner dependencies, they first have to be lifted to the next-outer remaining level, e.g., a dependency on a database becomes a dependency on the surrounding instance, and a dependency from a URL becomes a dependency from the surrounding web server. Multiple resulting dependencies between the same two components are reduced to one (if the dependencies are not labeled, otherwise the dependencies with the same labels are reduced to one). Several of these steps may not be needed; however, the steps as presented are efficient, and in practice they significantly reduce the problem size for the following more complex steps.

Figure 5:
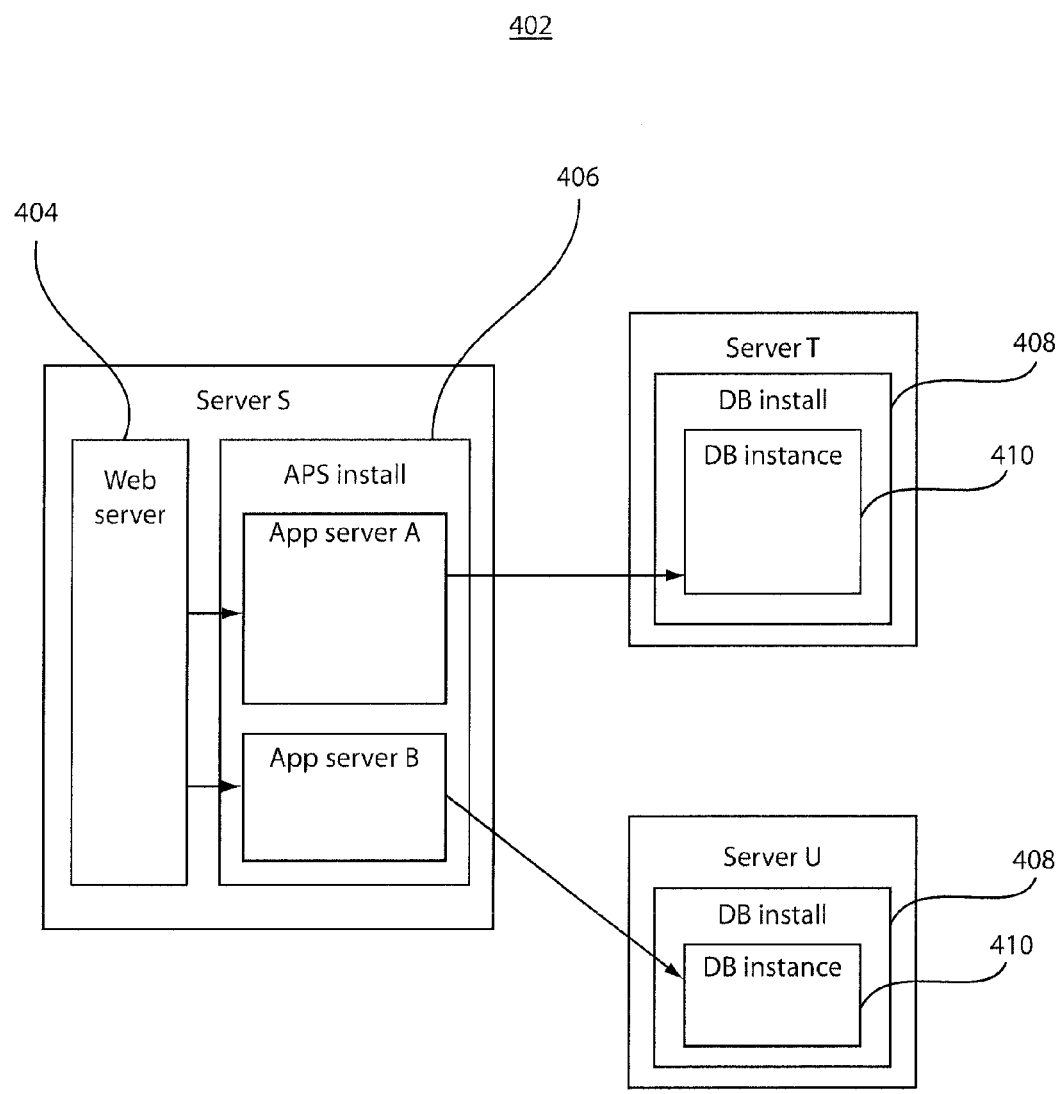
FIG. 5 is a block/flow diagram showing a source application used as an example for matching with the multi-image work sets in accordance with one embodiment.

Referring to FIG. 5 with continued reference to FIG. 4, an example of the preparatory phase is illustratively shown. Assume that we start with the source system 100 from FIG. 2, and that in block 302 (FIG. 4) the network file system (NFS) servers and file systems are declared as infrastructure. Also assume that external incoming dependencies on web server URLs are irrelevant (as they are not shown in the work sets, but will obviously occur). Then, the source infrastructure 100 is reduced to the structure 402 as shown in FIG. 5 for the matching with the work sets W, W', W''. Infrastructure 402 includes servers S, T and U and a web server 404, APS install 406 with App servers A and B and DB installs 408 with DB instances 410 on two different servers T and U; these are the same as in FIG. 2. The connectivity component of servers P, R, and X is excluded in block 308 (FIG. 4) because there are no Queue installs in the work sets. The inner components in the App servers and DB installs are no longer shown in accordance with block 312 because installs and instances are the only levels of depth that the work sets include. Certain dependencies of these inner components, e.g., those between Module 1 and DBa, and Module 2 and DB2, have been lifted to the containing instances in block 312.

Referring to FIG. 6, an image matching phase of the precise matching is illustratively shown. For each work set W in the catalogue with images $I_1, \ldots, I_n$, and each remaining connectivity component of the same size with servers $S_1, \ldots, S_n$:

In block 502, for i, k=1, ..., n determine whether $I_i$ and $S_k$ have the same included components and if yes, determine the set $\Phi$ of possible mappings. This is a tree isomorphism step with very few nodes. The method may include, e.g., term unification with commutative operators. We present an illustrative pseudo-code version.

In block 504, call a recursive subprogram treematch($I_i$, $S_k$), i.e., with the images themselves as tree roots. A definition of treematch(c, d) for arbitrary tree nodes c, d may include:

Let m, n be the number of children of c and d. If m≠n, return "false". If m=n=0, return ("true", {∈}), where ∈ denotes an empty mapping. Else initialize $\Phi$ to the empty set.

Explore each bijective mapping $\phi(c_1, \ldots c_n)=(d_1, \ldots d_n)$ from the children of c to the children of d where type($d_i$)=type($c_i$) for all i:
  i. For i=1, n call treematch($c_i$, $d_i$).
  ii. If all n calls return ("true", $\Phi_i$), augment the current set $\Phi$ by the following set of mappings: $\{\phi \cup \phi_1 \cup \ldots \cup \phi_n | \phi_i \in \Phi_i$ for all i=1, ..., n}.
  iii. Continue with the next mapping $\phi$
  iv. If all permutations have been tried unsuccessfully, return "false", else return ("true", $\Phi$)

In block 506, the mapping(s) are output to provide match candidates. Note that this image matching phase, by itself, can also be used for single-image matching as well as multi-image matching.

Referring to FIG. 7, a block/flow diagram for a dependency matching phase is illustratively depicted. For each possible component matching (of the given source connectivity component and work set), we now determine whether the dependencies also match (i.e., are isomorphic). In block 602, for each bijective mapping $\xi: \{I_1, \ldots, I_n\} \rightarrow \{S_1, \ldots, S_n\}$ and each element in the set of mappings $\Phi_i$ returned by treematch($I_i$, $\xi(I_i)$), call the overall component mapping $\lambda$. There most likely will only be one such mapping $\xi$ where treematch returned ("true", $\Phi_i$) for all i, and only one component isomorphism $\phi_i$ in each set $\Phi_i$. The maximum of n! mappings $\xi$ occurs only if all images in the work set have the same components. Even this is not a problem for a small n like 3, 4, or 5.

In block 604, determine whether the dependencies configured in the work set are also present between the corresponding source components; we mark such source dependencies as "used". For each overall mapping $\lambda$:
   i. Set all dependencies in the source connectivity component to "not used".
   ii. For each dependency (c, d) of the work set (where c, d are components of this work set), check whether ($\lambda$(s), $\lambda$(t)) is a "not used" dependency in the source connectivity component. (It will automatically be "not used" as long as we have single dependencies between components).
      1. If no, the mapping $\lambda$ is not a match, and abort it.
      2. If yes, mark ($\lambda$(s), $\lambda$(t)) as "used".

In block 606, if the end of the loop of block 604 was encountered, check whether all dependencies of the source connectivity component are now "used". If yes, this overall mapping $\lambda$, and this pair of a connectivity component and a work set, is a possible match. Otherwise, it is not.

In the migration block 210 of FIG. 3, the configurations of source software components that were matched to a multi-image work set are aligned with the configurations to the concrete deployed instantiation of that work set onto which these software components are migrated. The modification constraints from block 214 used in block 204 should ensure that this is feasible, and should be chosen to achieve a balance between additional standardization and migration cost. In particular, dependencies may be configured differently in the source systems than on the work-set images, e.g., addresses may be embedded in actual code rather than in configuration files of surrounding application servers, while the application server on the work set images have, say, Java™ Enterprise Edition (Java EE) setup of dependencies with the addresses in configuration files. To fully benefit from the multi-image work sets, such cases should be found and modified.

Referring to FIG. 8, in an alternate embodiment, precise matching with parameterized work sets (such as W' and W" in FIG. 1) includes performing the preparatory phase without block 306 (about matching sizes), and then performing the following steps for node matching and dependency matching. For each work set W in the catalog with images $I_1, \ldots, I_n$, and each remaining connectivity component $S_1, \ldots, S_m$ with m≥n:

In block 702, for i=1, . . . , n; k=1, . . . , m determine whether $I_i$ and $S_k$ have the same included components, and the set $\Phi$ of possible mappings, as with the non-parameterized work sets, e.g., as in FIG. 6. For each partitioning $(T_{1,1}, \ldots, T_{1,m1}), \ldots, (T_{n,1}, \ldots, T_{n,mn})$ of $S_1, \ldots, S_m$ such that each $T_{i,k}$ matches $I_i$:
   i. Build the corresponding expanded work set, i.e., with $m_n$ copies of each image $I_n$, and all the corresponding dependencies in block 704.
   ii. Then, in block 706, match the dependencies as in the previous case, i.e., as in FIG. 7.

This should yield 0 or 1 matches if the parameterized work set was defined so that no two separately listed images have the same components.

In other embodiments, graph modifications are permitted. These modifications may include permitting unused dependencies in the work set, by adopting a method or constraint so that the source system need not use all the dependencies that the work set offers (although it usually will in structures like work sets W, W', W"; otherwise, it will have more separate connectivity components). This may be achieved by omitting block 606 in FIG. 7. In the actual migration, the additional, unused dependency configurations on the instantiations of the work sets may be retained for potential future use and retained for the standard or deleted.

Unused components in the work set may also be permitted in another embodiment. We may have a set of source servers that are a subset of the components of a work set, e.g., a set like work set W' but without the proxy and with only one web server. Using work set W' here may be considered a waste of components and may not be allowed (i.e., in most cases precise matching will be preferred regarding this aspect), but the method can be extended to this case to accept the unused components.

In yet another embodiment, additional dependencies on the source systems are permitted. A typical work set will not have dangling dependencies (except for infrastructure nodes as introduced above), e.g., all dependencies are only among the images of the work set. One goal of the simplified management via work sets is not to introduce additional dependencies. Therefore, we look to find precisely matching source servers as in the methods described above. This may be relaxed to permit additional incoming or outgoing dependencies or both.

Server stacking may be permitted. We may permit that software installations, which may be on different servers, can be stacked onto a same image. For example in FIG. 2, we may or may not permit that a web server 109 from source server P and an APS install 111 from server R get moved onto a same image, thus making the union of these two servers similar to image I in work sets W and W". The treematch part would remain the same but is now only called on installs, not images. Similarly, the graph matching remains the same, but only for installs and inner components. The mapping of installs to images is arbitrary.

Software stacking may also be permitted. We may permit that software components of the same type, which were so far inside different outer components, can be stacked together into one. For example in FIG. 2, whether we can move Module 3 into App server A, delete App server B, and thus get this APS install 106 identical to those in work sets W, W', and W" can be resolved by software stacking. If this is permitted, it may be conditioned on a node configuration compatibility test as described above. Unstacking may permit separation of software installations or instances that were previously together, e.g., to make server S become compatible with Images I and K in work set W'. Another embodiment may allow additional software components on the source image.

Generally, in the embodiments where the matching is not precise, instead of simply declaring a match, the matching step may score different matchings according to how many differences there are between source systems and work set. The exact differences and/or scores may be output to the user to make a choice. The scores may also or alternatively be taken into account in selecting the overall mapping (206).

Figure 9:
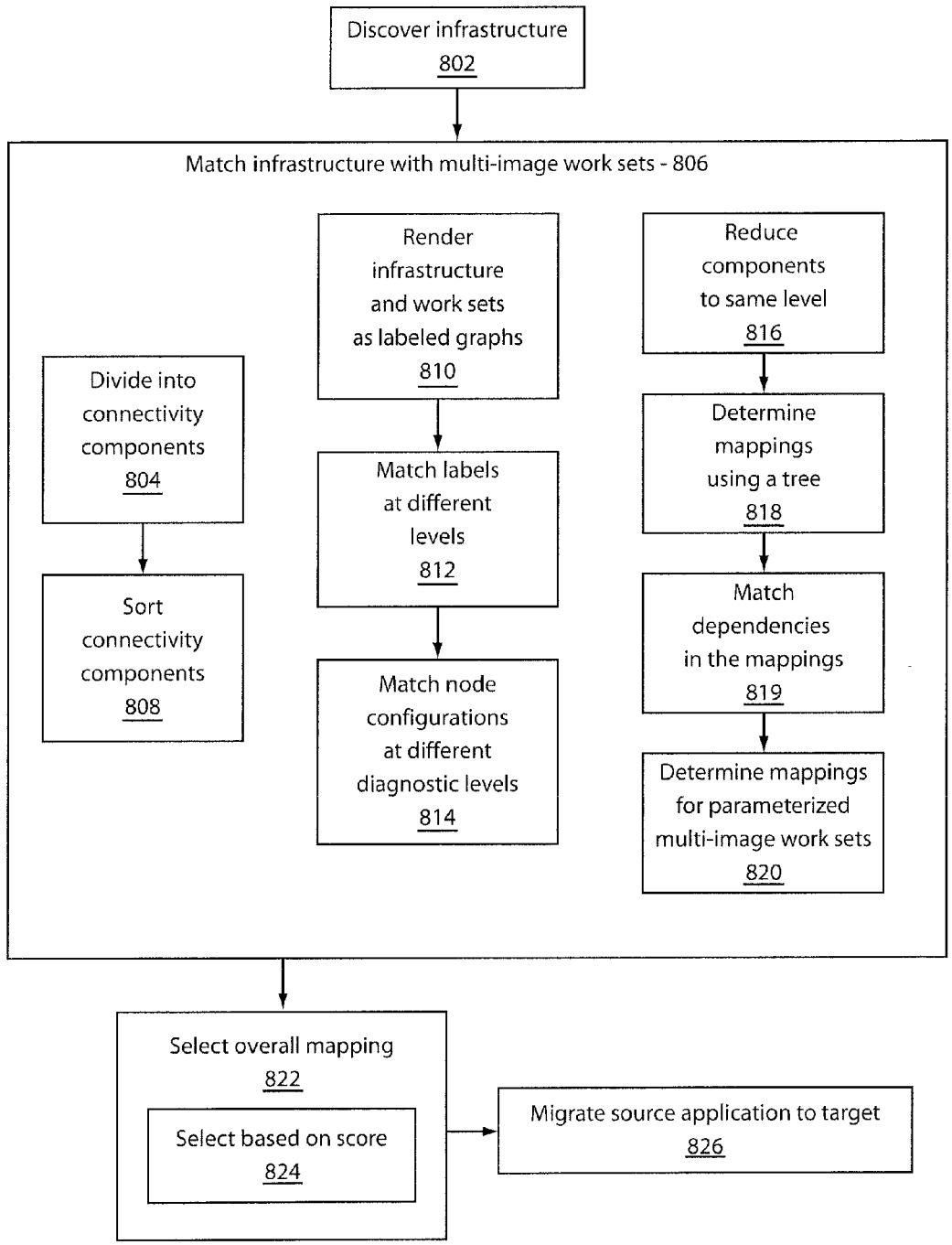
FIG. 9 is a block/flow diagram showing a system/method for analyzing and matching a source application with multi-image work sets to plan and perform a migration or modification in accordance with one embodiment.

Referring to FIG. 9, a system/method for migrating a source application to a target using multi-image work sets is illustratively shown. In block 802, an infrastructure of a source application is discovered.

In block 806, the infrastructure is matched with a plurality of multi-image work sets from a catalog. In block 804, a total source application may be divided into connectivity components or filtered by regions of interest to reduce the problem. In block 808, the connectivity components or regions of interest are sorted by size, based on middleware installs, or other criteria.

In block 810, the infrastructure of the source application and the multi-image work sets are rendered as labeled graphs of nodes and edges and the step of matching includes matching labels of the nodes and edges. In block 812, matching labels of the nodes and edges includes matching node types at different levels. In block 814, matching labels of the nodes and edges includes matching node configurations at different diagnostic levels.

In block 816, precise matching may be provided by reducing components of the infrastructure to a level of depth of the multi-image work sets. In block 818, a set of mappings is determined by recursively exploring a tree for each multi-image work set in the catalog. In block 819, matching dependencies are determined between the multi-image work sets and the infrastructure. In block 820, the matching may include determining a set of mappings for the infrastructure using parameterized multi-image work sets.

In block 822, an overall mapping is selected between components of the infrastructure with components in the multi-image work sets to provide one or more selected multi-images. In block 824, the mapping may be selected based upon a scoring method to determine a best match between the source application infrastructure and the multi-images. In block 826, the source application is migrated to a target environment using the selected multi-image.

Figure 10:
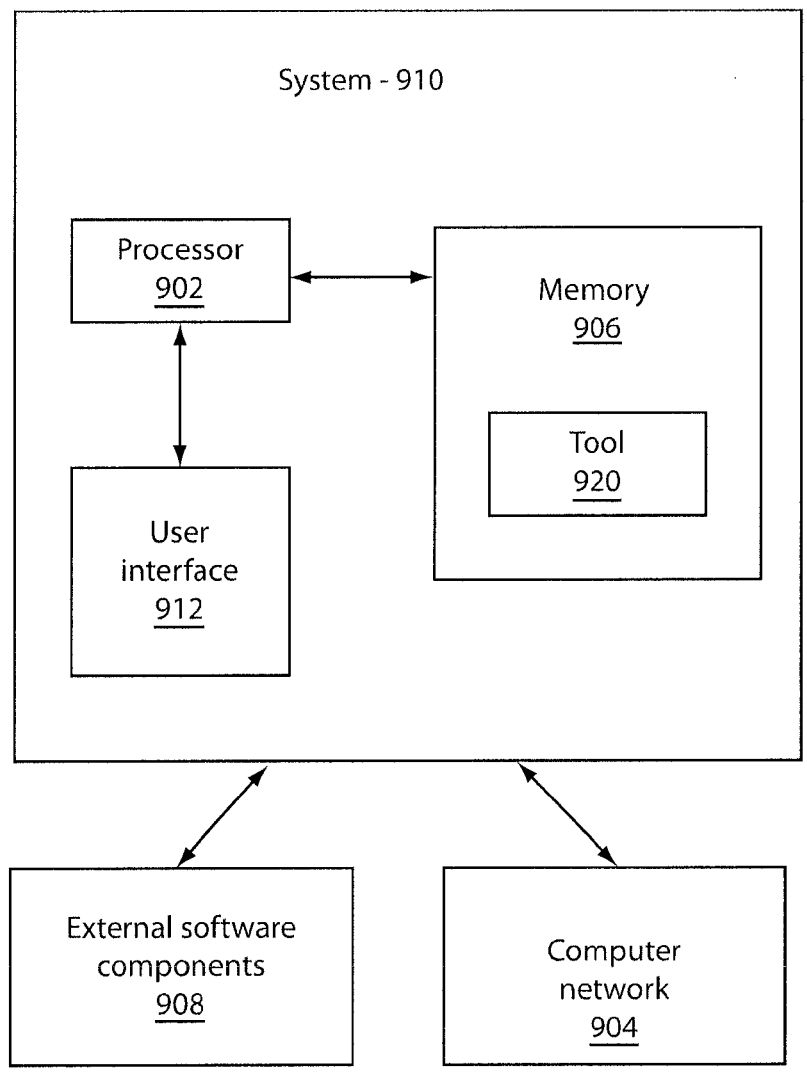
FIG. 10 is a block diagram showing a system for analyzing and matching a source application with multi-image work sets to plan and perform a migration or modification in accordance with another embodiment.

Referring to FIG. 10, a system 910 for analyzing source applications and matching them to multi-image work sets for transformation or migration is shown. System 910 includes one or more processors 902 coupled to a memory device or devices 906. A tool 920 for analyzing and matching is stored in memory and is executed using the processor 902. Tool 920 is configured to perform the methods as described with respect to FIGS. and in particular FIGS. 3 and 9. System 910 includes a user interface 912 which permits interactions with the system 910 to effectuate discovery, analysis and matching images for migration and other events. The system 910 can analyze code and access external sources (e.g., a computer network 904 or other external software components 908) in preparing for a migration or transformation and provide options to a user during the process.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
matching an infrastructure of a data source with a plurality of multi-image work sets from a catalog using a processor by selecting a mapping of components of the infrastructure with components in the multi-image work sets to provide one or more selected multi-images;
discovering dependencies of the data source and the multi-image work sets, and matching the dependencies of the data source with the dependencies of the multi-image work sets, wherein the matching includes determining a set of mappings by recursively exploring trees for each multi-image work set in the catalog; and
migrating the data source to a target environment using the one or more selected multi-images.

2. The method as recited in claim 1, further comprising rendering the infrastructure of the data source and the multi-image work sets as labeled graphs of nodes, and matching includes matching labels of the nodes.

3. The method as recited in claim 2, wherein matching labels of the nodes includes matching node types at different levels.

4. The method as recited in claim 2, wherein matching labels of the nodes includes matching node configurations at different diagnostic levels.

5. The method as recited in claim 1, wherein matching includes precise matching by reducing components of the infrastructure to a level of depth of the multi-image work sets.

6. The method as recited in claim 1, wherein matching includes:
dividing the source into connectivity components; and
excluding connectivity components with different sizes than the multi-image work sets.

7. The method as recited in claim 1, wherein matching includes:
listing middleware installs for images of the multi-image work sets in a list; and
excluding components outside the list and components with dependencies that are not associated middleware components.

8. The method as recited in claim 1, wherein matching includes determining matching dependencies between the multi-image work sets and the infrastructure.

9. The method as recited in claim 1, wherein matching includes determining a set of mappings for the infrastructure using parameterized multi-image work sets.

10. A computer readable storage medium comprising a computer readable program, wherein the computer readable program when executed on a computer causes the computer to perform the steps of:
matching an infrastructure of a data source with a plurality of multi-image work sets from a catalog by selecting a mapping of components of the infrastructure with components in the multi-image work sets to provide one or more selected multi-images;
discovering dependencies of the data source and the multi-image work sets, and matching the dependencies of the data source with the dependencies of the multi-image work sets, wherein the matching includes determining a set of mappings by recursively exploring trees for each multi-image work set in the catalog; and
migrating the data source to a target environment using the one or more selected multi-images.

11. The computer readable storage medium as recited in claim 10, further comprising rendering the infrastructure of the data source and the multi-image work sets as labeled graphs of nodes and the step of matching includes matching labels of the nodes.

12. The computer readable storage medium as recited in claim 11, wherein matching labels of the nodes includes matching node types at different levels.

13. The computer readable storage medium as recited in claim 11, wherein matching labels of the nodes includes matching node configurations at different diagnostic levels.

14. The computer readable storage medium as recited in claim 10, wherein matching includes precise matching by reducing components of the infrastructure to a level of depth of the multi-image work sets.

15. The computer readable storage medium as recited in claim 10, wherein matching includes:
dividing the source into connectivity components; and
excluding connectivity components with different sizes than the multi-image work sets.

16. The computer readable storage medium as recited in claim 10, wherein matching includes:
listing middleware installs for images of the multi-image work sets in a list; and
excluding components outside the list and components with dependencies that are not associated middleware components.

17. The computer readable storage medium as recited in claim 10, wherein matching includes determining matching dependencies between the multi-image work sets and the infrastructure.

18. The computer readable storage medium as recited in claim 10, wherein matching includes determining a set of mappings for the infrastructure using parameterized multi-image work sets.

19. A system, comprising:
a processor;
a memory coupled to the processor and configured to execute a tool for matching multi-image work sets with a source application, the tool configured to:
match an infrastructure of the source application with a plurality of multi-image work sets from a catalog;
select a mapping of components of the infrastructure with components in the multi-image work sets to provide one or more selected multi-images;
discover dependencies of the source application and the plurality of multi-image work sets, and matching the dependencies of the source application with the dependencies of the plurality of multi-image work sets; and
migrate the source application to a target environment using the one or more selected multi-images,
wherein a set of mappings between the infrastructure and the multi-image work sets is obtained by recursively exploring a tree for each multi-image work set in the catalog and matching the dependencies between components of the multi-image work sets and the infrastructure.

20. The system as recited in claim 19, wherein the infrastructure of the source application and the multi-image work sets include labeled graphs of nodes.

21. The system as recited in claim 20, wherein labels of the nodes are matched at different levels and labels of node configurations are matched at different diagnostic levels.

22. The system as recited in claim 20, wherein the set of mappings includes parameterized multi-image work sets.

* * * * *